(12) United States Patent
Pfizenmaier et al.

(10) Patent No.: US 10,359,001 B2
(45) Date of Patent: Jul. 23, 2019

(54) METHOD FOR PRODUCING A PISTON

(71) Applicant: Mahle International GmbH, Stuttgart (DE)

(72) Inventors: Lothar Pfizenmaier, Lichtenwald (DE); Reiner Mueller, Rottweil (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 15/297,109

(22) Filed: Oct. 18, 2016

(65) Prior Publication Data
US 2017/0107936 A1    Apr. 20, 2017

(30) Foreign Application Priority Data
Oct. 19, 2015   (DE) .................. 10 2015 220 256

(51) Int. Cl.
| | | |
|---|---|---|
| *B21K 1/18* | (2006.01) | |
| *B22C 9/10* | (2006.01) | |
| *B22C 9/24* | (2006.01) | |
| *F02F 3/00* | (2006.01) | |
| *F02F 3/22* | (2006.01) | |

(Continued)

(52) U.S. Cl.
CPC ............ *F02F 3/20* (2013.01); *B21K 1/185* (2013.01); *B22C 9/105* (2013.01); *B22C 9/108* (2013.01); *B22C 9/24* (2013.01); *B22D 15/02* (2013.01); *B22D 29/002* (2013.01); *B22D 31/002* (2013.01); *B23K 31/02* (2013.01); *B23P 15/10* (2013.01); *F02F 3/003* (2013.01); *F02F 3/0015* (2013.01); *F02F 3/22* (2013.01); *F02F 2003/0061* (2013.01); *F02F 2200/00* (2013.01); *F02F 2200/04* (2013.01); *F02F 2200/06* (2013.01)

(58) Field of Classification Search
CPC .. F02F 3/20; F02F 3/0015; F02F 3/003; F02F 2200/04; F02F 2003/0061; F02F 2200/06; F02F 3/16; B22C 9/108; B22C 9/105; B22C 9/24; B23P 25/00; B21K 1/185; B22D 31/002; B22D 29/002; B23K 31/02
See application file for complete search history.

(56) References Cited

U.S. PATENT DOCUMENTS 2,041,355 A * 5/1936 Koether ............... B23P 15/105
29/90.01
5,934,922 A    8/1999 Chiotis
(Continued)

FOREIGN PATENT DOCUMENTS

| CH | 466 969 A | 12/1968 |
|---|---|---|
| DE | 813 301 C | 9/1951 |

(Continued)

OTHER PUBLICATIONS

English abstract for DE-10352246.
(Continued)

*Primary Examiner* — Jacob M Amick
*Assistant Examiner* — Charles Brauch
(74) *Attorney, Agent, or Firm* — Fishman Stewart PLLC

(57) ABSTRACT

A method for producing a piston of an internal combustion engine, with a cooling duct, may include producing a piston blank with a cooling duct, closing an inlet and an outlet of the cooling duct by at least one closure element, machine-finishing the piston blank, and removing the at least one closure element.

20 Claims, 1 Drawing Sheet

(51) Int. Cl.
  *B22D 15/02* (2006.01)
  *B22D 29/00* (2006.01)
  *B22D 31/00* (2006.01)
  *B23K 31/02* (2006.01)
  *B23P 15/10* (2006.01)
  *F02F 3/20* (2006.01)

(56) References Cited

U.S. PATENT DOCUMENTS

| | | | |
|---|---|---|---|
| 7,108,269 | B2 | 9/2006 | Benkel et al. |
| 2010/0299922 | A1* | 12/2010 | Gniesmer ............ B23K 20/12 29/888.044 |
| 2011/0265744 | A1* | 11/2011 | Allig ..................... F02F 3/22 123/41.35 |
| 2012/0325166 | A1 | 12/2012 | Kollotzek et al. |
| 2013/0312695 | A1* | 11/2013 | Bischofberger .......... F02F 3/18 123/193.6 |
| 2014/0331958 | A1 | 11/2014 | Bing et al. |

FOREIGN PATENT DOCUMENTS

| | | | | |
|---|---|---|---|---|
| DE | 2945935 | A1 * | 5/1981 | ........ B25D 11/125 |
| DE | 4030016 | A1 | 4/1991 | |
| DE | 10148493 | A1 | 4/2003 | |
| DE | 10220485 | A1 | 11/2003 | |
| DE | 69813776 | T2 | 4/2004 | |
| DE | 10352246 | A1 | 6/2005 | |
| DE | 202006013555 | U1 | 12/2006 | |
| DE | 102005047035 | B3 | 4/2007 | |
| DE | 102011076455 | A1 | 11/2012 | |
| DE | 102011106655 | A1 | 1/2013 | |
| DE | 102011086411 | A1 | 5/2013 | |
| DE | 102012215543 | A1 | 3/2014 | |
| DE | 102014211350 | A1 | 12/2014 | |
| EP | 2210697 | A1 | 7/2010 | |

OTHER PUBLICATIONS

English abstract for DE-102011086411.
English abstract for DE-102011106655.
English abstract for DE-102012215543.
English abstract for DE-102014211350.
English abstract for DE-202006013555.
German Search Report for DE-102015220256.9, dated Jun. 15, 2016.
English Abstract for DE-102005047035-B3.
English Abstract for DE-10220485-A1.
English Abstract for EP-2210697-A1.
EP Search Report for EP 16188861.5, dated Mar. 2, 2017.
Office Action dated Aug. 29, 2018 for copending European Patent Application No. 16188861.5.

\* cited by examiner

METHOD FOR PRODUCING A PISTON

CROSS-REFERENCE TO RELATED APPLICATION

This application claims priority to German Application No. DE 10 2015 220 256.9, filed on Oct. 19, 2015, the contents of which are hereby incorporated by reference in their entirety.

TECHNICAL FIELD

The present invention relates to a method for producing a piston of an internal combustion engine. The invention also relates to a closure element of such a piston and to a piston produced according to this method.

BACKGROUND

DE 10 2011 086 411 A1 discloses a method of the type in question for producing a piston of an internal combustion engine with a casting mould, in which a releasable casting core is placed and secured on supports of the casting mould. The casting mould is subsequently closed and a casting material introduced. Once the casting material has solidified, the casting mould is separated from the cast piston, wherein, after the piston is removed from the mould, at least one quill-type pin is removed, while at least one end portion remains cast in the piston and closes the cooling duct at this point. The dissolvable casting core itself is then dissolved in particular is rinsed out. By this means, in particular improved holding or securing of a casting core in the casting mould is intended to be able to be achieved.

DE 10 2012 215 543 A1 discloses a casting mould of a piston of an internal combustion engine with a soluble and substantially annular casting core for forming a cooling duct, and with at least two supports supporting said casting core during the casting operation. A panel element or closure element is arranged here at a connecting point between at least one of the two supports or an additional third support and the casting core, said panel element or closure element being at least partially fixedly connected to the piston after the casting operation and closing the connecting parts after removal of the casting core or forming an at least constricted intermediate outlet. The intention is thereby to be able to increase the stability of the casting mould and thus substantially simplify the handling thereof.

In previous methods for producing a piston, there has always been the problem, after the production of a piston blank of the piston, that, during the subsequent finish-machining chips or other dirt could under some circumstances enter the cooling duct and could no longer be removed from there with absolute certainty before the piston is put into operation in an internal combustion engine. It is true that the finish-machined pistons have also already to date been cleaned, under a high technical outlay, with up to 100 bar water pressure and, in the process, the cooling duct has been washed out, but, in this process, it could not absolutely reliably be ensured that the cooling duct was completely free of impurities, and therefore, for example, metal chips could be undesirably caught within the cooling duct. Impurities of this type remaining in the cooling duct may lead, however, during operation of the internal combustion engine, to malfunctions or in general to customer complaints regarding a required cleanliness of the components.

SUMMARY

The present invention is therefore concerned with the problem of specifying, for a method of the type in question, an improved or at least an alternative embodiment which overcomes the disadvantages known from the prior art.

This problem is solved according to the invention by the subject matter of the independent claims. Advantageous embodiments are the subject matter of the dependent claims.

The present invention is based on the general concept of, prior to the actual finish-machining of a piston, closing a cooling duct thereof by means of closure elements and thereby of protecting same against undesired dirt. In the case of the method according to the invention for producing the piston of an internal combustion engine, a piston blank is first of all produced, for example is forged or cast, and, after the production of the piston blank, both an inlet and an outlet of the cooling duct are closed by means of a closure element and only then is the piston finish-machined. After the operations are finished, the closure elements are removed and therefore the cooling duct which has been protected against dirt is exposed. As mentioned, this can take place irrespective of whether the piston blank has been cast or forged. In each case, the cleanliness of the components can be increased and the risk of metal chips which are not removed can be reduced. The method according to the invention therefore protects the cooling duct in a particularly simple but at the same time effective manner against dirt by the closure elements according to the invention being introduced into the inlet and the outlet of the cooling duct and closing said inlet and outlet prior to the actual finish-machining of the piston.

In an advantageous development of the solution according to the invention, the piston blank is cast, for example from aluminium, wherein a casting mould with a negative contour of a cooling duct is used, and wherein first of all the casting mould is closed and subsequently a casting material is introduced therein. After cooling of the casting material, the casting mould is opened and the piston blank removed. Both an inlet and an outlet of the cooling duct are then closed by means of a closure element and only subsequently is the piston finish-machined. After the operations are finished, the closure elements are removed and therefore the cooling duct which has been protected from dirt is exposed. The method according to the invention functions here irrespective of whether the cooling duct is formed by a negative contour/ negative mould designed as a releasable casting core, or else by two recesses which are each arranged in a cast piston upper part and a piston lower part cast separately thereto and only form the cooling duct when the piston upper part and the piston lower part are put together. If the negative mould for the cooling duct is formed here by the previously mentioned soluble casting core, in particular a salt core or a sand core, said soluble casting core is, of course, secured in the casting mould prior to the closing thereof. The inlet and the outlet can be arranged here in the piston lower part or in a cooling duct covering.

In an advantageous development of the solution according to the invention, the cooling duct is rinsed after removal of the closure elements and, in the process, the soluble casting mould is dissolved, in particular is rinsed out. The dissolution and rinsing out of the casting core can therefore take place entirely at the end of the method according to the invention, as a result of which possible intermediate steps can be avoided and the method as a whole can be accelerated. Alternatively, it is, of course, also conceivable that, after the casting mould is opened, first of all the soluble casting core is rinsed out and only subsequently are the inlet and the outlet of the cooling duct closed by means of the closure elements.

The method according to the invention also functions in the same manner in the case of a piston blank which is assembled from a forged piston upper part and a separately forged piston lower part and, as a result, the cooling duct is formed. The piston upper part and the piston lower part are welded to each other. In the case of the forged steel piston, the piston upper part can be manufactured separately from the piston lower part and said parts can be joined to each other later by means of friction welding, laser welding, soldering, etc. Corresponding recesses in the piston upper part and/or the piston lower part then form the cooling duct. It is, of course, conceivable here for the inlet and the outlet to be provided in the piston lower part or in a cooling duct covering.

In an advantageous development of the solution according to the invention, a swellable round pin composed of a natural sponge material, a cotton wool pin or a swellable plastics pin is used as the closure element. A common feature of all of these embodiments is that they cannot only be easily assembled, but also swell upon an influx of water or oil and thereby bring about a particularly tight closure of the cooling duct. In addition, swellable closure elements of this type can also be removed again comparatively easily and in particular can also be recycled by drying, which is of great advantage in particular from environmental aspects and protection of resources.

In a further advantageous embodiment of the method according to the invention, a cork plug or a wooden pin is used as the closure element, wherein it can alternatively also be provided that the inlet and the outlet of the cooling duct are closed with a closure element formed from a hot-melt adhesive. A closure element designed as a cork plug or wooden pin constitutes a particularly ecological and durable variant, wherein, of course, the closing of the inlet and of the outlet by means of a hot-melt adhesive or a plastic adhesive in general has the great advantage of being able to be reliably applied in an automated manner and neutrally in terms of cycle time and of likewise being able to be easily removed after the finish-machining of the piston. Plastic adhesives likewise constitute a comparatively cost-effective material which is also recyclable.

The present invention is furthermore based on the general concept of specifying a closure element for such a piston. A closure element of this type can be designed as a swellable round pin composed of a natural sponge material, as a cotton wool pin, as a swellable plastics pin, as a cork plug, as a wooden pin or as a plug formed from a plastic adhesive/hot-melt adhesive. Particularly in the case of the closure element being designed as a cork plug or as a wooden pin, a wedge-shaped embodiment permitting reliable closing of the inlet and of the outlet of the cooling duct may also be conceivable. In addition, by provision of a head on the closure element, unintentional slipping of the closure element into the inlet or outlet of the cooling duct and therefore into the cooling duct can be reliably avoided. The closure element can also be more easily grasped during removal via such a head.

Further important features and advantages of the invention emerge from the dependent claims, from the drawings and from the associated description of the figures with reference to the drawings.

It goes without saying that the features mentioned above and those which have yet to be explained below are usable not only in the respectively stated combination, but also in different combinations or on their own without departing from the scope of the present invention.

Preferred exemplary embodiments of the invention are illustrated in the drawings and are explained in more detail in the description below, wherein the same reference signs refer to identical or similar or functionally identical components.

BRIEF DESCRIPTION OF THE DRAWINGS

In the drawings, in each case schematically.

DETAILED DESCRIPTION

Figure 1:
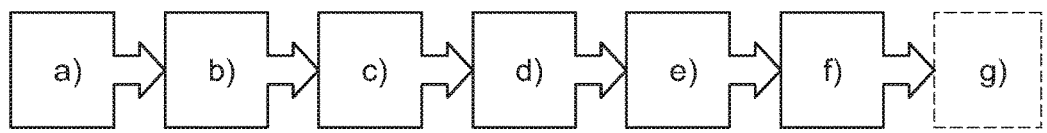
FIG. 1 shows a method according to the invention for producing a piston with individual method steps.
Figure 2:
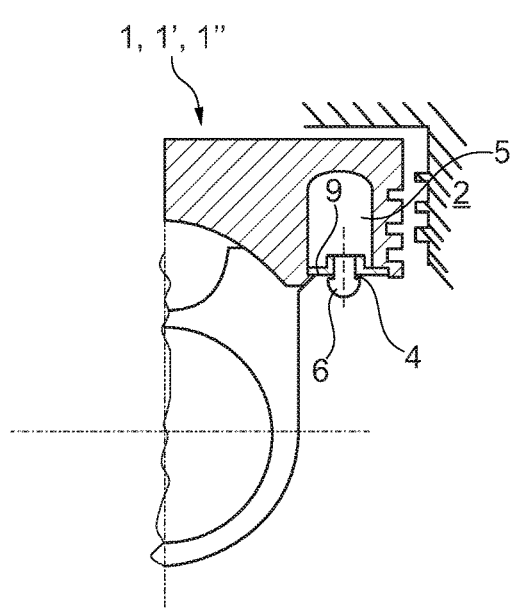
FIG. 2 shows a sectional illustration through a piston according to the invention with a cooling duct covered by means of a cooling duct covering.

According to FIG. 1, a method according to the invention for producing a piston 1 (also see FIGS. 2 to 5) of an internal combustion engine (not shown otherwise), preferably of a motor vehicle, has a total of six method steps a) to f), and also additionally an optional method step g). The explained method for producing the piston 1 is a casting method in which, first of all in a method step a), a casting mould 2 depicting the negative shape of the piston 1 is closed and a casting material, for example aluminium or steel, is subsequently introduced into the casting mould 2, in method step b), and, as a result, a piston blank 1' is cast. The casting mould 2 is only partially illustrated in FIG. 2. A negative shape of a cooling duct 5 is integrated here in the casting mould 2, wherein said negative shape can be formed by the casting mould 2 itself or by a corresponding casting core, for example a sand core or a salt core. Subsequently, the casting mould 2 is opened in method step c). According to the invention, in method step d), an inlet 3 and an outlet 4 are then closed by means of a closure element 6 according to the invention. In the subsequent method step e), the piston blank 1' is finish-machined, after which the closure elements 6 are removed in method step f). By the inlet 3 and the outlet 4 of the cooling duct 5 being closed by means of the closure elements 6 according to the invention prior to the finish-machining, contamination of the cooling duct 5 during the finish-machining can be eliminated, and therefore at the same time, for example, penetration of metal chips into the cooling duct 5 can be avoided.

In principle, the piston blank 1' can also be assembled from a cast piston upper part 7' and a cast piston lower part 8' and, in the process, the cooling duct 5 can be formed. The piston upper part 7' and the piston lower part 8' are welded to each other, for example are joined by friction welding, laser welding, soldering, etc. The inlet 3 and the outlet 4 are arranged here either in the piston lower part 8' or in a cooling duct covering 9.

Up to now, the contaminations admitted into the cooling duct 5 have been washed out of the cooling duct 5, with a high technical outlay, at a high water pressure of up to 100 bar after the manufacturing, but it has not been possible to entirely ensure that the cooling duct 5 was completely free of contamination since, for example, metal chips could be caught in the cooling duct 5. The cleanliness of the components required by the customer has therefore not been ensured under some circumstances or ensured only with a very high outlay. By contrast, in the case of the method according to the invention, contamination of the cooling duct 5 with, for example, metal chips can be entirely eliminated since both the inlet 3 and the outlet 4 of the cooling duct 5 are closed prior to the machining, in particular prior to the finish-machining, and, as a result, the cooling duct 5 is sealed.

In the case of a cast piston blank 1', prior to the method step a) in which the casting mould 2 is closed, the soluble casting core depicting the negative shape of the cooling duct 5, in particular a salt or sand core, can, of course, be fixed in a known manner in the casting mould 2. Alternatively, it is also conceivable for the casting mould 2 to in each case provide a half shell of a negative shape of the cooling duct 5, wherein, in this case, the piston 1 is assembled, for example, from a piston upper part 7' and a piston lower part 8' (cf. FIG. 3).

In a method step g) subsequent to the method step f), the soluble casting core can be removed from the cooling duct 5, in particular rinsed out or washed out. Purely theoretically, it is also conceivable here for the optional method step g) to already be carried out after the method step c), that is to say prior to closing of the inlet 3 and the outlet 4 by means of the closure element 6. The letter "g" therefore does not mean that this method step absolutely has to be carried out at the end of the method according to the invention.

The method according to the invention also functions in an identical manner in the case of a piston blank 1" which is assembled from a forged piston upper part 7" and a separately forged piston lower part 8" and, as a result, the cooling duct 5 is formed. The piston upper part 7" and the piston lower part 8" are welded to each other. In the case of the forged steel piston, the piston upper part 7" is manufactured separately from the piston lower part 8" and the two parts 7" and 8" are joined to each other later by friction welding, laser welding, soldering, etc. Corresponding recesses in the piston upper part 7" and/or in the piston lower part 8" then form the cooling duct 5. It is, of course, also conceivable here for the inlet 3 and the outlet 4 to be provided in the piston lower part 8" or in a cooling duct covering 9.

Figure 3:
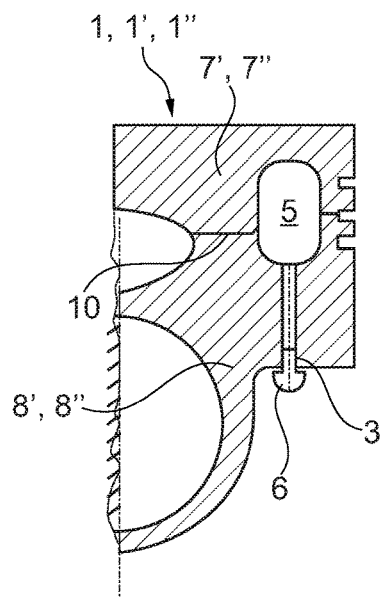
FIG. 3 shows a sectional illustration as in FIG. 2, but in the case of a different embodiment of the cooling duct and of the piston.
Figure 4:
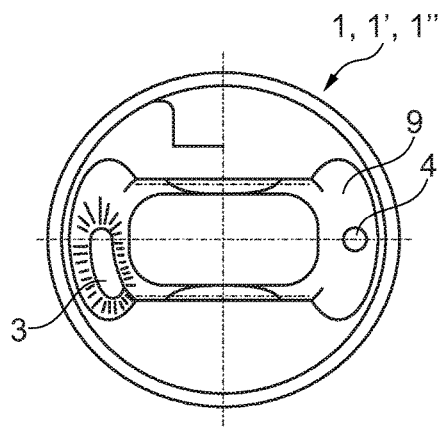
FIG. 4 shows a view from below of the piston according to FIG. 2.
Figure 5:
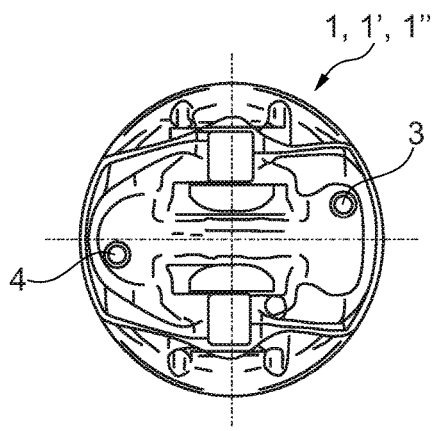
FIG. 5 shows a view from below of the piston according to FIG. 3.

The separating line 10, which is shown in FIG. 3, between piston upper part 7', 7" and piston lower part 8', 8", which separating line defines a later connecting seam, should be understood here only purely by way of example, and therefore said separating line may, of course, also extend at a different location.

Looking now at the closure element 6 according to the invention, the latter can be designed as a swellable round pin composed of a natural sponge material, as a cotton wool pin or as a swellable plastics pin. A shape of the closure element 6 is, of course, adapted to the shape of the inlet 3 or of the outlet 4, and therefore the closure element 6, for example in the case of an inlet 3 in the shape of a segment of a circular ring, has a design likewise in the shape of a segment of a circular ring (cf. the inlet 3 according to FIG. 4).

Alternatively, the closure element 6 can, of course, also be designed as a cork plug or as a wooden pin and can thereby be produced durably and ecologically as in the case of the previously mentioned design.

Alternatively, in turn, it is also conceivable for the inlet 3 and the outlet 4 of the cooling duct 5 to be closed with a closure element 6 formed from a hot-melt adhesive/plastic adhesive, wherein such a closure element 6 can be removed in a simple manner after the finish-machining of the piston 1 and can be applied beforehand in a reliable manner and neutrally in terms of cycle time. Such a plastic adhesive or hot-melt adhesive also adheres to moist surfaces wetted with cooling lubricant, as a result of which the manufacturing sequence is simplified. A type of hood is formed here from the "hot-melt adhesive", said hood being hollow on the inside, and therefore the latter can be better/more easily removed afterwards by the automated tool (similarly as in FIGS. 1 and 2).

With the method according to the invention, the piston 1 can therefore be produced significantly more reliably in respect of, for example, technical regulations regarding cleanliness of the components since the cooling duct 5 is closed by the closure elements 6, and therefore sealed and protected against dirt, during the machining steps customarily causing the dirt. The closure elements 6 can be produced cost-effectively here and can be simply integrated into the manufacturing sequence.

The invention claimed is:

1. A method for producing a piston of an internal combustion engine, with a cooling duct, comprising:
   producing a piston blank with a cooling duct,
   closing an inlet and an outlet of the cooling duct by at least one closure element to seal the cooling duct,
   machine-finishing the piston blank, and
   removing the at least one closure element to complete the piston.

2. The method according to claim 1, wherein producing the piston blank includes casting the piston blank.

3. The method according to claim 2, further comprising, prior to casting the piston blank, securing a releasable casting core as a negative contour for the cooling duct in a casting mould.

4. The method according to claim 3, further comprising, prior to closing the inlet and the outlet of the cooling duct or after removing the at least one closure element, dissolving the releasable casting core.

5. The method according to claim 1, wherein at least one of:
   producing the piston blank includes assembling the piston blank from a cast piston upper part and a cast piston lower part, during which the cooling duct is formed,
   the inlet and the outlet are arranged in the cast piston lower part, and
   a cooling duct cover is provided in which the inlet and the outlet are arranged.

6. The method according to claim 1, wherein:
   producing the piston blank includes assembling from a forged piston upper part and a forged piston lower part, during which the cooling duct is formed,
   the forged piston upper part and the forged piston lower part are welded to each other, and
   the inlet and the outlet are provided in one of the forged piston lower part or in a cooling duct cover.

7. The method according to claim 1, wherein the at least one closure element is one of a swellable round pin composed of a natural sponge material, a cotton wool pin, and a swellable plastic pin.

8. The method according to claim 1, wherein one of:
   the at least one closure element is one of a cork plug and a wooden pin, or
   the at least one closure element is formed from a plastic adhesive.

9. A piston for an internal combustion engine produced by a process comprising:
- producing a piston blank with a cooling duct,
- closing an inlet and an outlet of the cooling duct by at least one closure element to seal the cooling duct,
- machine-finishing the piston blank, and
- removing the at least one closure element to complete the piston.

10. The piston according to claim 9, wherein producing the piston blank includes casting the piston blank.

11. The piston according to claim 10, further comprising, prior to casting the piston blank, securing a releasable casting core as a negative contour for the cooling duct in a casting mould.

12. The piston according to claim 11, further comprising, prior to closing the inlet and the outlet of the cooling duct or after removing the at least one closure element, dissolving the releasable casting core.

13. The piston according to claim 9, wherein at least one of:
- producing the piston blank includes assembling the piston blank from a cast piston upper part and a cast piston lower part, during which the cooling duct is formed,
- the inlet and the outlet are arranged in the cast piston lower part, and
- a cooling duct cover is provided in which the inlet and the outlet are arranged.

14. The piston according to claim 9, wherein:
- producing the piston blank includes assembling from a forged piston upper part and a forged piston lower part, during which the cooling duct is formed,
- the forged piston upper part and the forged piston lower part are welded to each other, and
- the inlet and the outlet are provided in one of the forged piston lower part or in a cooling duct cover.

15. The piston according to claim 9, wherein one of:
- the at least one closure element is designed as one of a swellable round pin composed of a natural sponge material, as a cotton wool pin, and as a swellable plastic pin,
- the at least one closure element is one of a cork plug or a wood pin, or
- the at least one closure element is designed as a plug formed from a plastic adhesive.

16. The method according to claim 3, wherein the releasable casting core is one of a sand core and a salt core.

17. The method according to claim 4, dissolving the releasable casting core includes rinsing the releasable casting core out of the cooling duct.

18. The method according to claim 2, wherein the at least one closure element is one of a swellable round pin composed of a natural sponge material, a cotton wool pin, and a swellable plastic pin.

19. The method according to claim 2, wherein one of:
- the at least one closure element is one of a cork plug and a wooden pin, or
- the at least one closure element is formed from a plastic adhesive.

20. A method for producing a piston of an internal combustion engine, with a cooling duct, comprising:
- producing a piston blank with a cooling duct,
- closing an inlet and an outlet of the cooling duct by at least one closure element,
- machine-finishing the piston blank, and
- removing the at least one closure element;
- wherein the at least one closure element is one of a swellable round pin composed of a natural sponge material, a cotton wool pin, and a swellable plastic pin.

* * * * *